United States Patent
Bourdoncle et al.

(10) Patent No.: US 7,806,526 B2
(45) Date of Patent: Oct. 5, 2010

(54) PROGRESSIVE OPHTHALMIC LENS AND METHOD OF PRODUCING ONE SUCH LENS

(75) Inventors: Bernard Bourdoncle, Charenton-le-Pont (FR); Bruno Decreton, Charenton-le-Pont (FR); Cyril Guilloux, Charenton-le-Pont (FR)

(73) Assignee: Essilor International (Compagnie Generale d'Optique), Charenton-le-Pont (FR)

( * ) Notice: Subject to any disclaimer, the term of this patent is extended or adjusted under 35 U.S.C. 154(b) by 235 days.

(21) Appl. No.: 11/722,914

(22) PCT Filed: Dec. 19, 2005

(86) PCT No.: PCT/FR2005/003184

§ 371 (c)(1),
(2), (4) Date: Jun. 27, 2007

(87) PCT Pub. No.: WO2006/072683

PCT Pub. Date: Jul. 13, 2006

(65) Prior Publication Data
US 2008/0143959 A1    Jun. 19, 2008

(30) Foreign Application Priority Data
Jan. 4, 2005    (FR)    ................................. 05 00038

(51) Int. Cl.
*G02C 7/06*    (2006.01)
*G02C 7/04*    (2006.01)
(52) U.S. Cl. ........................ 351/169; 351/176; 351/177
(58) Field of Classification Search ................. 351/169, 351/176
See application file for complete search history.

(56) References Cited

U.S. PATENT DOCUMENTS 5,444,503 A * 8/1995 Kelch et al. ................. 351/169

(Continued)

FOREIGN PATENT DOCUMENTS

DE    3331757    5/1985

(Continued)

OTHER PUBLICATIONS

Pope., "Progressive Lenses: History, Design, Wearer Satisfaction and Trends," *Vision Science and It's Applications*, OSA Tops vol. 35, (2000).

(Continued)

*Primary Examiner*—Jordan M. Schwartz
(74) *Attorney, Agent, or Firm*—Occhiuti Rohlicek & Tsao LLP

(57) ABSTRACT

The invention relates to a progressive ophthalmic lens and to a method of producing one such lens. Variations in the optical power and the astigmatism of a progressive ophthalmic lens (10) result from (i) spherical and cylindrical variations in the anterior face (2) of the lens and (ii) variations in another physical unit of the lens. In this way, it is possible to customise the design of the progressive lens as a function of at least one behavioural characteristic of the lens wearer. Said customisation can be repeated by modulating the values of the physical unit between the different points of the lens. As a result, progressive lenses with different designs can be obtained from identical semi-finished lenses. The physical unit can comprise the sphere and the cylinder of the posterior face of the lens (3).

24 Claims, 7 Drawing Sheets

U.S. PATENT DOCUMENTS

| | | | |
|---|---|---|---|
| 5,861,934 A | 1/1999 | Blum et al. | |
| 6,123,422 A | 9/2000 | Menezes et al. | |
| 7,338,163 B2 * | 3/2008 | Carimalo et al. | 351/169 |
| 2003/0107707 A1 * | 6/2003 | Fisher et al. | 351/177 |

FOREIGN PATENT DOCUMENTS

| | | |
|---|---|---|
| DE | 10252814 | 3/2004 |
| EP | 0562336 | 9/1993 |
| FR | 2871248 * | 12/2005 |
| WO | WO2004/034095 | 4/2004 |
| WO | WO2004/046792 | 6/2004 |

OTHER PUBLICATIONS

Allione et al. "Application of Optimization in computer-aided ophthalmic lens design," *Part of the EUROPTO Conference on Design and Engineering of Optical Systems*-Berlin, Germany—SPIE vol. 3737, pp. 138-148, (1999).

* cited by examiner

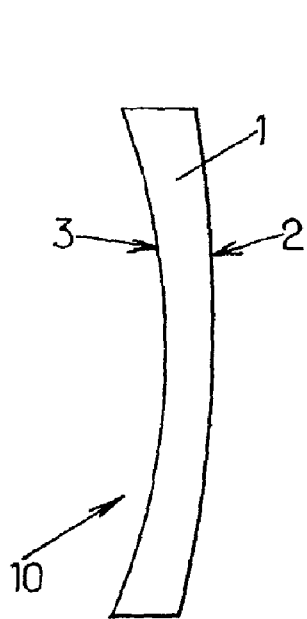
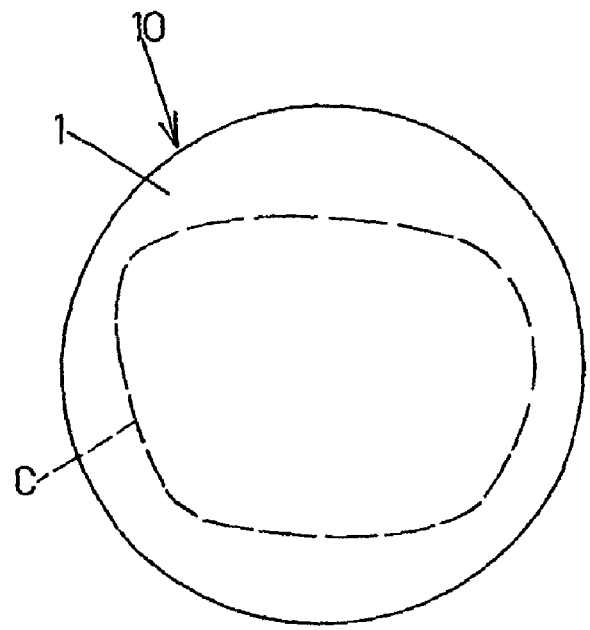
FIG.1a          FIG.1b.
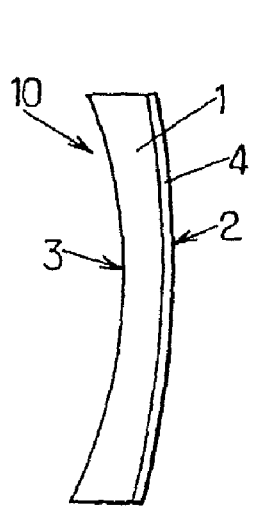
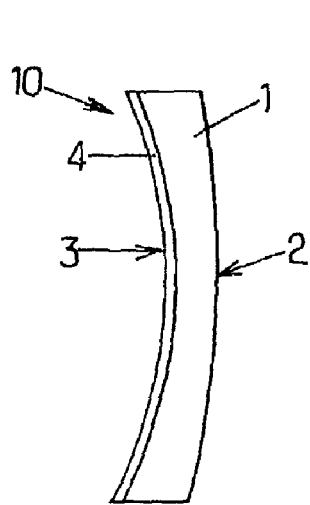
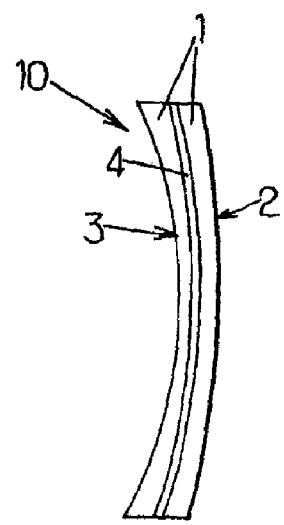
FIG.8a          FIG.8b.          FIG.8c.

PROGRESSIVE OPHTHALMIC LENS AND METHOD OF PRODUCING ONE SUCH LENS

CROSS-REFERENCE TO RELATED APPLICATIONS

This application is being filed as a U.S. National Stage under 35 U.S.C. 371 of International Application No. PCT/FR2005/003184, filed on Dec. 19, 2005, which claims the benefit of French Application No. 05/00,038, filed Jan. 4, 2005. The contents of both applications are hereby incorporated by reference in their entirety.

The present invention relates to a progressive ophthalmic lens, as well as a method for producing one such lens.

BACKGROUND

Usually, an ophthalmic lens comprises a visual correction that is determined by a prescription established for the wearer of the lens. Such a prescription indicates in particular a value for the optical power and a value for the astigmatism adapted to correct the distance vision of a wearer. These values are usually obtained by combining the anterior face of the lens with a generally spherical or spherotoric posterior face. For a progressive lens, at least one of the two faces of the lens has spherical and cylindrical variations, resulting from variations in optical power and astigmatism, between different observation directions through the lens. The type of variations of optical power and astigmatism of the lens are called design. In particular, the difference in optical power between two points dedicated to distance vision and to near vision is called addition, and its value should also correspond to the value prescribed for a far-sighted wearer.

Currently, a progressive lens is produced in two successive steps. The first step consists of producing a semifinished lens, of which the anterior face has spherical and cylindrical variations initially defined to correspond to the desired design. This is performed in a factory, for example by molding or injection. Semifinished lenses are divided into several models which can differ, in particular, by the base, by the distribution of sphere and cylinder of the anterior face, or by addition. The base is the sphere at the point on the lens corresponding to distance vision. The distance between the near vision and distance vision points, the respective widths of the zones of the lens corresponding to near vision and distance vision, the refractive index of the transparent material that constitutes the semifinished lens etc, can also differ from one model to another. Each combination of these characteristics corresponds to a different model of semifinished lens.

The second step is performed in laboratories located between factory and retail sales center within the distribution chain for ophthalmic lenses. It consists of machining in a separate step a sphere or a spherotoric surface on the posterior face of the lenses, so that each lens corresponds to the prescription of the wearer.

At the present time, a trend has appeared whereby the design of progressive lenses is customized according to supplementary characteristics of the wearer, other than the usual prescription characteristics. Such supplementary characteristics may concern in particular the position of the head of the wearer and that of his eyes for a distance vision situation and a near vision situation. The progressive lens may then, for example, be selected so that the distance vision and near vision points are situated at locations in the lens that are adapted in relation to the positions of the head and eyes of the wearer.

In the organization for producing progressive lens described above, taking into account individual wearers' characteristics for the design of lenses, requires a multiplication of models of semifinished lenses. The series of semifinished lenses for each model that are produced in a factory are then shorter. Their cost price is consequently higher. Moreover, this results in complex stock management in the laboratories, since these must have reserves available for a large number of models of semifinished lenses.

In order to avoid such multiplication of models of semifinished lenses, a novel organization of the production line for progressive ophthalmic lenses has been proposed. According to this novel organization, the design of the progressive lens is provided by the posterior face of the lens. Semifinished lenses then possess an anterior spherical face and the posterior face is machined subsequently according to the prescription and to the design that is adapted to the individual characteristics determined for each wearer. Such an organization is particularly flexible, given that any individual characteristic of the wearer is no longer involved in the selection of the semifinished lens model. In particular, a smaller number of semifinished lens models is sufficient for obtaining all the configurations of finished lenses.

However, in this case, the posterior face of the lens possesses a complex form. Indeed, the design and correction result together from this form. Subsequent machining of the posterior face of the semifinished lens then requires that laboratories be equipped with machines capable of producing such shapes. Such machines, which correspond to what is called a "free-form" method, are themselves complex and therefore costly. For these reasons, subsequent machining of the posterior faces of lenses should be grouped together in a restricted number of specialized laboratories, which goes contrary to customization of lenses moved downstream in the production and distribution chain.

Document U.S. Pat. No. 5,444,503 describes a progressive ophthalmic lens with an anterior face which can be a progressive surface and a posterior face which is formed not only in order to obtain the prescribed correction for the wearer, but also in order to take account of individual conditions of use of the lens. These individual conditions of use include the depth of the eyes, the distance of vision, the inclination of the lens in front of the eye according to the frame into which the lens is fitted, and the shape of the frame. The posterior face of the lens may then also be aspheric or atoric. Customization of the lens is therefore achieved, in addition to the correction of ametropia, without increasing the number of semifinished lens models. However, such customization only takes account of the physical characteristics of the eye and/or of the frame. Now, such characteristics are insufficient for procuring an improvement in the comfort of the wearer under many conditions in which the lens is used.

An object of the present invention is therefore to combine economical production of progressive lenses with customization of the design of each lens according to at least one individual characteristic of the wearer other than his prescription, while procuring an improvement in the comfort of the wearer under a large number of conditions of use.

SUMMARY

To this end, the invention provides a progressive ophthalmic lens comprising an anterior face, a posterior face and an intermediate medium producing variations in optical power and astigmatism when said lens is used by a wearer, in which said variations comprise:

a first contribution resulting from variations of the sphere and cylinder of the anterior face of the lens; and a second contribution resulting from variations of at least one physical parameter of the lens distinct from the sphere and cylinder of the anterior face.

Furthermore, values of the physical parameter at different points on the lens are adapted so that the second contribution produces customization of variations in optical power and astigmatism of the lens as a function of at least one behavioral characteristic of a wearer of said lens.

The behavioral characteristic, as a function of which the values of the physical parameter are adapted, may concern one or more habitual attitudes and/or movements of the wearer. This may in particular be an amplitude of horizontal eye movements with respect to a rotation of the wearer's head, when the wearer scans a field of vision horizontally. This characteristic is preferably measured on the wearer by using suitable instrumentation. Such a behavioral characteristic is not, by its very nature, an optical or physical characteristic of the wearer's eyes, nor a characteristic associated with a frame into which the lens is intended to be fitted.

In addition, in a known manner, the use of the lens by the wearer corresponds to variable directions of observation through the lens. Each direction of observation is referenced by two angles, with respect to a horizontal plane and with respect to a vertical plane respectively. A light ray coming from a given direction of observation intersects each face of the lens at two respective points of intersection, and passes through a center of rotation of the eye that is assumed to be fixed. The points of intersection of the light ray with each face of the lens are determined according to the principles of optical refraction. The optical power and astigmatism values of the progressive lens for a given direction then result from the sphere and cylinder values of each face of the lens at the points of intersection of the optical ray and of the value of the refractive index of the intermediate medium as well as its possible gradient.

Thus, according to the invention, variations in optical power and astigmatism of the progressive lens are obtained partly by the anterior face and partly by means of a physical parameter of the lens that is adjusted in order to customize the lens according to the wearer. The shape of the anterior face of the lens is therefore independent of the customization achieved by means of the physical parameter. Progressive lenses that are customized differently as regards design, can therefore be obtained from identical semifinished lenses. Thus, a reduced number of semifinished lens models is sufficient to meet all the needs for progressive lenses of a population. Semifinished lenses can then be produced economically in large production runs.

According to a preferred embodiment of the invention, the second contribution is less than the first contribution, in absolute values, for the variation of optical power present between a distance vision point and a near vision point of the lens. In other words, customization of the lens that is achieved by means of the physical parameter only slightly modifies the addition of the progressive lens. Adjustment of the design which corresponds to this customization is then limited so that it can be easily achieved subsequently without very specialized equipment being required. Potentially, for the variation of optical power between the distance vision point and the near vision point, the second contribution is substantially zero. The addition of the progressive lens then only results from the first contribution to variations in optical power and it is solely determined by the anterior face of the lens.

The physical parameter of the lens, through which variations in optical power and astigmatism of the lens are customized, may be of various types. In particular, this may be:

a sphere and a cylinder of the posterior face of the lens, in which case the physical parameter is modulated during subsequent machining of the posterior face of the lens;

a refractive index of a substantially transparent layer included within the lens. This layer may consist of a material with a refractive index that can be adjusted by irradiation. In this case, the physical parameter is modulated by selectively irradiating different portions of the layer in a variable manner; or a refractive index of the intermediate medium situated between the anterior and posterior faces of the lens. This intermediate medium may consist of a material with a refractive index that can be adjusted by irradiation. In this case, the physical parameter is modulated by selectively irradiating different portions of the intermediate medium in a variable manner.

Possibly, an optical power of the prescription and an astigmatism of the prescription can also result from values of the physical parameter at different points on the lens. Modulation of the physical parameter then makes it possible, in a single production step to obtain simultaneously a correction of ametropia which corresponds to the prescription and a design adapted to the behavior of the wearer.

Alternatively, the prescribed optical power and the prescribed astigmatism, which correspond to the correction of ametropia, can result from values of another physical parameter of the lens at different points thereon. This other physical parameter is distinct from the sphere and cylinder of the anterior face, and from the physical parameter that is the origin of the second contribution to variations in optical power and astigmatism of the lens. Similarly to the later, said other physical parameter of the lens may include a sphere and a cylinder of the posterior face of the lens, a refractive index of a substantially transparent layer included within the lens, or a refractive index of the intermediate medium. Depending on the nature of said other parameter, values thereof at different points on the lens can be fixed during subsequent machining of the posterior face of the lens, or during selective irradiation of different portions of the layer or of the intermediate medium, when one of these consists of a material with a refractive index that can be adjusted by irradiation.

Various customizations of the design of the progressive lens according to the behavioral characteristics of the wearer can be achieved in this way. Among these adaptations, one may cite in particular:

a modification of the width of a field of near vision and/or a field of distance vision, with respect to an effective field of near vision and/or an effective field of distance vision respectively, which would result only from the variations of the sphere and cylinder of the anterior face of the lens;

a modification of a maximum value of astigmatism reached in the lateral parts of the lens, with respect to an effective maximum value of astigmatism in said lateral parts which would result only from the variations of the sphere and of the cylinder of the anterior face of the lens;

a displacement of the location of a point situated in the lateral parts of the lens at which the maximum value of astigmatism is reached, in relation to an effective location of said point which would result only from the variations of the sphere and cylinder of the anterior face of the lens;

a modification in the continuous variation of the optical power of the lens along a meridian line between the distance vision point and the near vision point of the lens, with respect to an effective variation of the optical power between said points which would result only from the variations of the sphere and of the cylinder of the anterior face of the lens; and a lateral displacement of the near vision point of the lens, with respect to an effective location of said point which would result only from the variations of the sphere and of the cylinder of the anterior face of the lens.

The invention also provides a method for producing a progressive ophthalmic lens which comprises an anterior face, a posterior face and an intermediate medium. The method comprises the following steps:

producing a semifinished lens in which the anterior face has variations in sphere and cylinder in order to obtain a first contribution to variations in optical power and astigmatism of the lens when said lens is used by a wearer;

measuring at least one behavioral characteristic of the wearer of the lens;

determining values of a physical parameter of the lens distinct from the sphere and cylinder of the anterior face, so that a second contribution to the variations in optical power and astigmatism of the lens results from variations of said physical parameters between different points on the lens, said second contribution achieving customization of the variations of optical power and astigmatism of the lens according to the behavioral characteristic measured, and modulating the physical parameter so as to obtain said second contribution.

The semifinished lens can be produced in a factory, the behavioral characteristic of the wearer can be measured at an optician's, and the physical parameter of each lens can be modulated in a laboratory intermediate between the factory and the retail sales center for the lens. For such an organization for producing progressive lenses, the result of the behavioral measurement carried out on the wearer at the optician's is communicated to the laboratory, so that the latter can determine values of the physical parameter that should be generated at each point of the lens. Alternatively, modulation of the physical parameter can be achieved directly in the retail sales center if this center is equipped with apparatus capable of performing this modulation.

BRIEF DESCRIPTION OF THE DRAWINGS

Other features and advantages of the present invention will become apparent in the following description of nonlimiting examples of embodiments, with reference to the appended drawings in which:

FIGS. 1a and 1b are respectively a cross-sectional view and a plan view of a progressive ophthalmic lens;

FIGS. 8a-8c are respective cross-sectional views progressive ophthalmic lenses according to alternative embodiments of the invention.

DETAILED DESCRIPTION

Figure 2A:
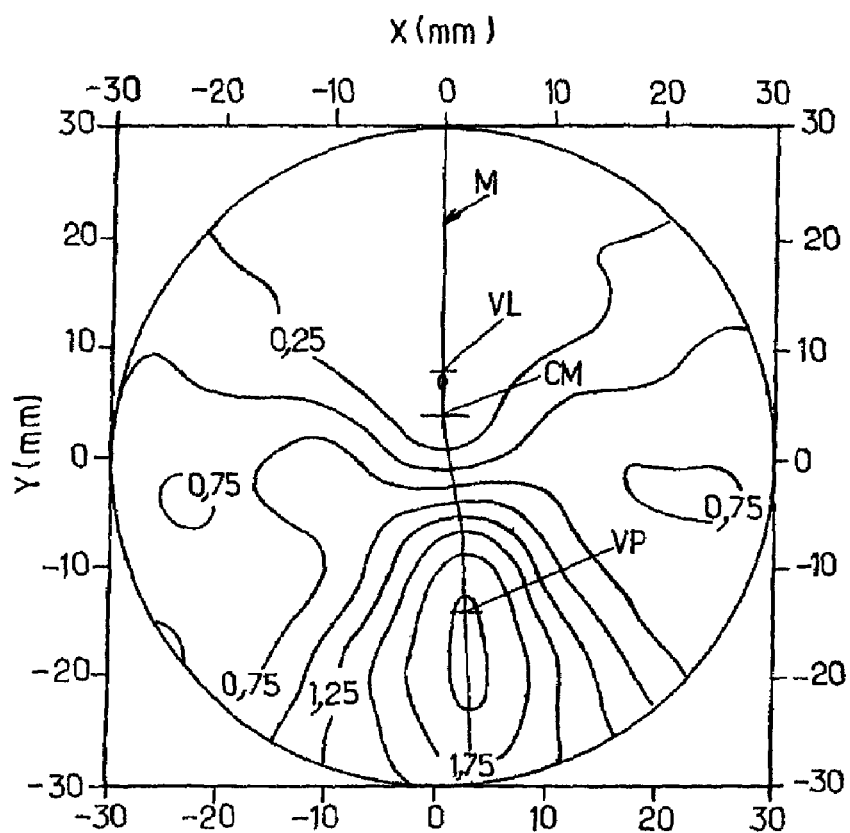
FIGS. 2a and 2b are maps of variations in sphere and in cylinder of an anterior face of a lens according to FIGS. 1a and 1b.

According to FIG. 1a, an ophthalmic lens 10 consists of an intermediate medium 1, which is limited by an anterior face 2 and by a posterior face 3. The medium 1 is transparent and can be made of an inorganic or organic material, characterized by a refractive index value. The optical characteristics of the lens 10 result from a combination of this refractive index value with the shapes of the faces 2 and 3. In a known manner, a lens ready to be fitted into a spectacle frame is obtained by trimming the lens 10 along outline C that corresponds to the shape of the frame (FIG. 1b).

Each face 2, 3 of the lens can be defined geometrically by the mean sphere and cylinder values for each point on this face. These mean sphere and cylinder values are well known to a person skilled in the art and it will be possible to refer to published documents in order to obtain their mathematical expressions. In a simplified manner, the mean sphere, denoted S in FIGS. 5a, 5b and expressed in diopters, corresponds to the mean curvature of a face at a point thereon. The cylinder corresponds to a difference between the two curvatures, denoted respectively C1 and C2, of a toroid tangential to the face of the lens at a given point thereon. For sake of clarity, the mean sphere is denoted in this document only by sphere.

The lens 10 is obtained from a semifinished lens, denoted hereinafter by semifinished, of which the anterior face possesses a definite shape. In other words, the values of the sphere and cylinder of the anterior face 2 are not modified when the lens 10 is subsequently produced from the semifinished. In the example that will be described in detail below, the lens 10 is obtained by machining the posterior face 3 of the semifinished, so as to give the latter values of the sphere and cylinder adapted so as to obtain a particular optical function.

Figure 2B:
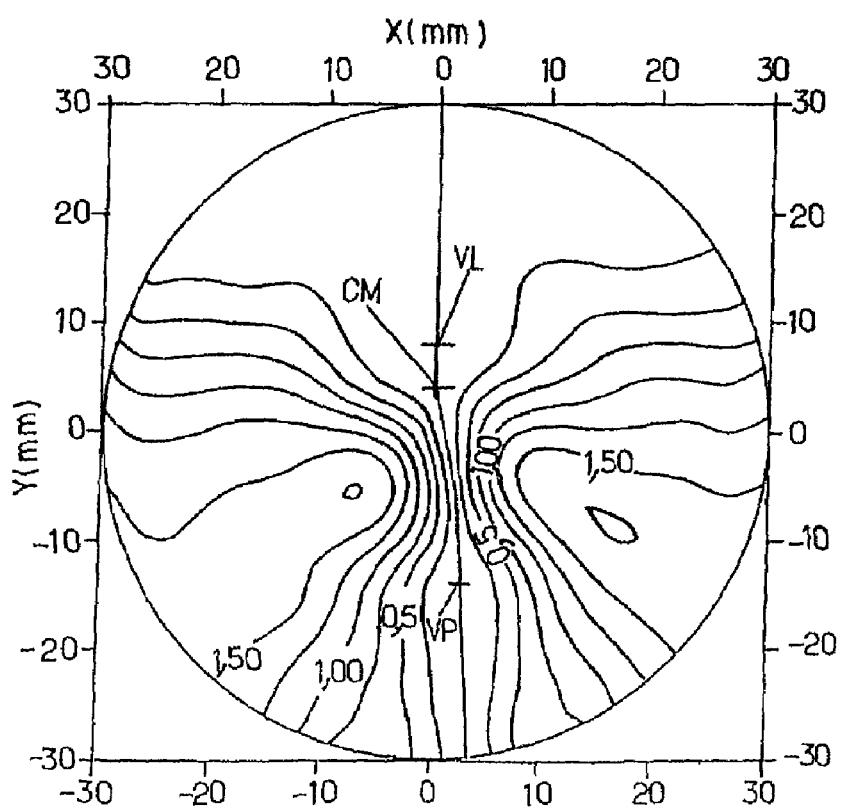

FIGS. 2a and 2b are maps respectively of values of the sphere and cylinder of the anterior face 2 of the semifinished. This face is limited by a circular rim of the semifinished and each point thereon is referenced by two rectangular coordinates, denoted X and Y respectively and expressed in millimeters (mm). The lines indicated on FIG. 2a are isosphere lines, which connect points on the face 2 corresponding to the same value for the sphere. This value is indicated in diopters for some of these lines. Similarly, the lines indicated in FIG. 2b are isocylinder lines that connect points on the face 2 corresponding to the same value of the cylinder.

Three particular points, denoted CM, VL and VP respectively, are reference points on these maps. The point CM, called the fitting cross, is the point on the lens 10 that must be placed facing the center of the wearer's eye for which the lens 10 is intended. The point VL is the center of a zone of the lens used for distance vision. Similarly, the point VP is the center of a zone of the lens used for near vision. VL is located on a central vertical line of the face 2 passing through CM (corresponding to X=0) and VP is offset laterally (parallel to the X axis) in relation to CM and VL. The direction of lateral offset of VP is reversed between a right lens and a left lens. The lens 10 corresponding to the figures is a lens for the right eye. A line M, called the prime meridian line, connects the points VL, CM and VP. It corresponds to the scanning of the eye of the wearer when he or she successively observes objects situated in front of him or her at variable heights and distances.

Usually, and recalled here by way of a comparative reference, the posterior face 3 of the semifinished is subsequently machined according to the prescription of the wearer in order to obtain the lens 10. The prescription indicates an optical power value, an addition value and an astigmatism value. The latter is composed, in a known manner, of a datum for the amplitude of the astigmatism and an angular datum, which locates the orientation of the corrective toroid parallel to the lens. Conventional machining gives the face 3 uniform sphere and cylinder values. In other words, the face 3 is not progressive. Variations in the optical power of the lens 10, which include addition, and variations in astigmatism thus result only from the geometrical characteristics of the anterior face 2 of the lens.

Figure 3A:
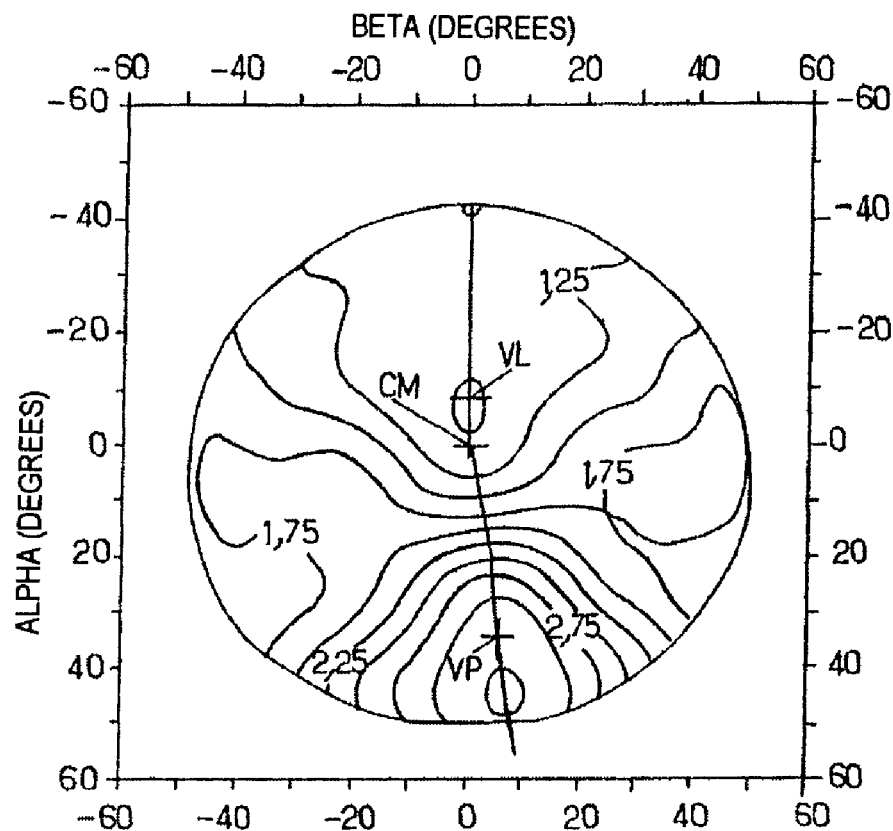
FIGS. 3a and 3b are maps of optical power and astigmatism of a lens having an anterior face according to FIGS. 2a and 2b and a spherical rear face.
Figure 3B:
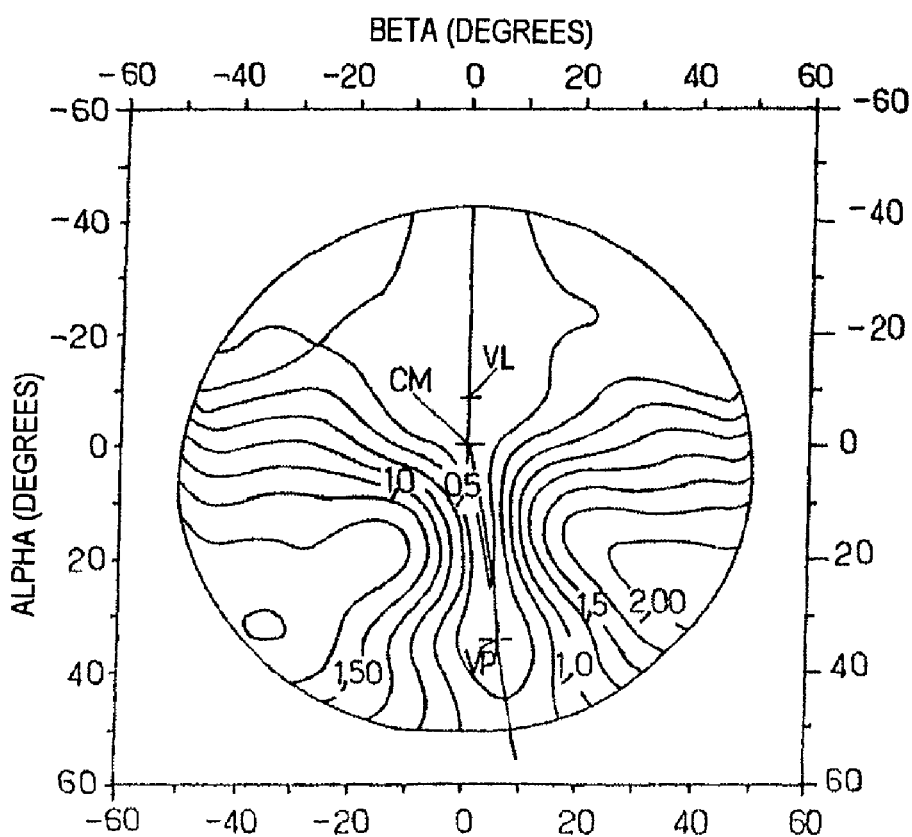

FIGS. 3a and 3b illustrate the optical characteristics of a lens 10 of which the posterior face 3 has uniform sphere and cylinder values. For the example considered, the refractive index of the intermediate medium 1 of the lens 10 is 1.665. FIGS. 3a and 3b are maps respectively of optical power and astigmatism values of the lens 10. Each direction of observation through the lens 10 is identified by means of two angular coordinates expressed in degrees: alpha measures the observation height in relation to a horizontal plane, and beta measures the rotation of the eye in this horizontal plane. The origin of this system of angular coordinates (alpha=0; beta=0) corresponds to the point CM on the lens 10. The directions that correspond respectively to the points VL and VP are also indicated on these maps. The lines indicated in FIG. 3a are isopower lines which connect the directions of observation through the lens 10 that correspond to the same optical power value. This value is indicated in diopters for some of these lines. For the example considered, the power of visual correction is 3.20 diopters in near vision (point VP) and the difference in optical power of the lens 10 between observation directions which correspond to the points VP and VL is 2.21 diopters (i.e. addition value). Similarly, the lines indicated in FIG. 3b are isoastigmatism lines, which connect directions of observation through the lens 10 that correspond to the same value of astigmatism. It should be stated that the astigmatism values indicated in FIG. 3b correspond to actual values from which the prescribed astigmatism value has been subtracted. For this reason, the values indicated are called resultant astigmatism values and they are almost zero for the observation directions which correspond to the points VL and VP. The residual resultant astigmatism value that is possibly present for these two observation directions is by its nature spherical.

Figure 4A:
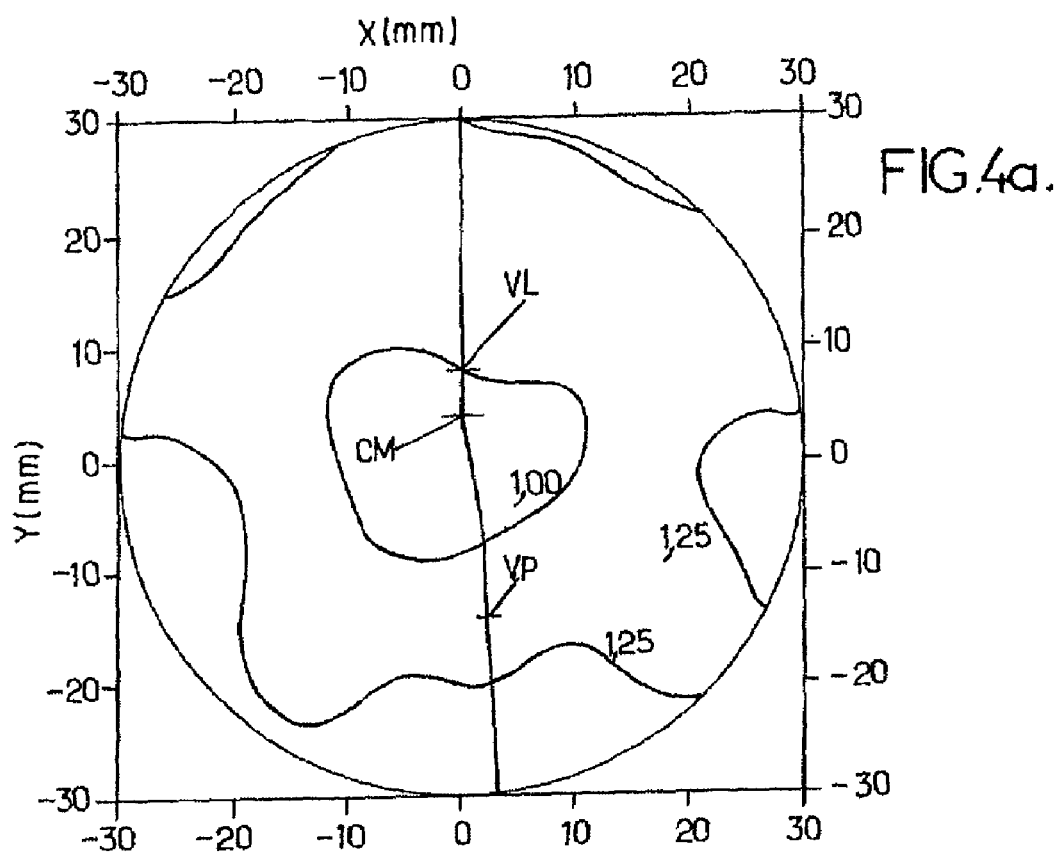
FIGS. 4a and 4b are maps of the sphere and cylinder of a posterior face of a lens machined according to a first embodiment of the invention.
Figure 4B:
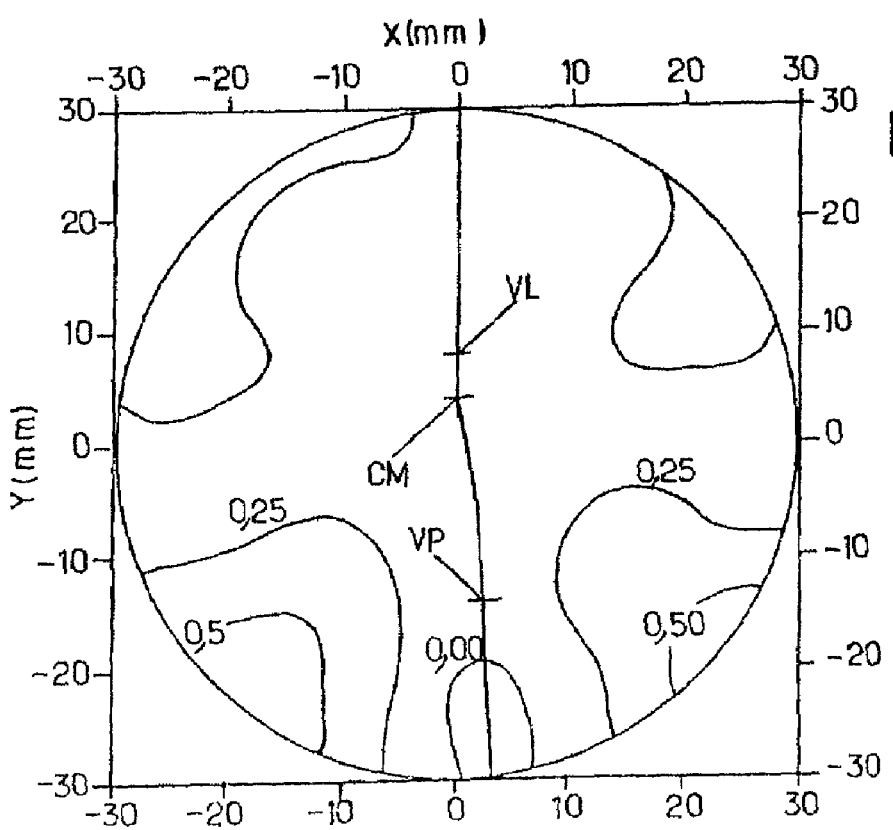

According to the particular embodiment of the invention described here, the posterior face 3 of the semifinished is subsequently machined so as to give it a sphere and a cylinder that vary between different points in this face. Thus, contrary to the normal method of producing progressive lenses which has just been recalled, the posterior face 3 of the lens contributes to a variation in optical characteristics of the lens 10 which is obtained from the semifinished. FIGS. 4a and 4b correspond to FIGS. 2a and 2b respectively, for the posterior face 3 of the lens 10. Thus, FIG. 4a indicates the value of the sphere at each point on the posterior face 3. Similarly, FIG. 4b indicates the value of the cylinder at each point on the face 3. The distance between the isosphere lines of FIG. 4a (respectively isocylinder of FIG. 4b) that is greater than the distances visible in FIG. 2a (2b respectively), indicates that the posterior face 3 of the lens 10 has variations in sphere (respectively in cylinder) that are less than those of the anterior face 2. For this reason, the face 3 can be machined using a relatively simple machine, which has in particular a reduced number of axes for the movement of the tool. Such a machine is less costly and easier to use. It can thus be installed in a large number of sites close to retail sales centers for lenses, or even in these centers.

Figures 5A, 5B:
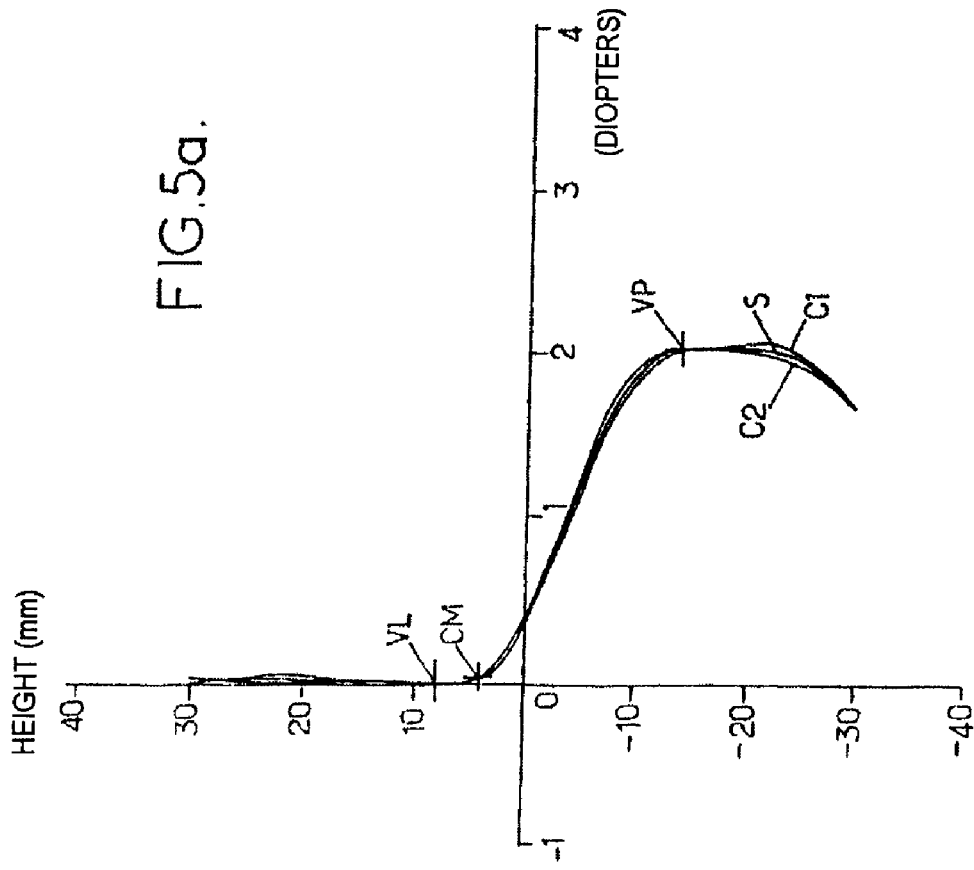
FIGS. 5a and 5b represent variations of sphere and variations of curvature along the prime meridian line of a lens, respectively for an anterior face of the lens corresponding to FIGS. 2a and 2b and for a posterior face of the lens corresponding to FIGS. 4a and 4b.

FIG. 5b illustrates the variations in sphere S and in curvatures C1, C2 of the posterior face 3 along the prime meridian line M. The vertical axis locates the displacement along this line, measured in millimeters, and the horizontal axis locates the values of S, C1 and C2, expressed in diopters. The sphere values indicated on this figure correspond to the actual sphere values of the face 3, from which the sphere value corresponding to the optical power prescription (1.05 diopters in the example considered) has been subtracted. According to this figure, the posterior face 3 has values of sphere S that are substantially identical at the points VP and VL.

As a comparison with FIG. 5b, FIG. 5a illustrates variations of sphere S and curvatures C1, C2 of the anterior face 2 along the prime meridian line M, for a lens corresponding to FIGS. 2a and 2b. The variations of sphere S and of curvatures C1, C2 for the posterior face 3 are therefore very much smaller than the corresponding variations for the anterior face 2.

As previously, the optical power and astigmatism of the lens 10 each results from the shapes of the two faces 2 and 3 and of the refractive index of the intermediate medium 1. However, given that the face 3 also has variations of the sphere and cylinder, variations in optical power and astigmatism of the lens 10 result from the combination of the variations of sphere and cylinder of the two faces 2 and 3. In other words, the variations of sphere and cylinder of the anterior face 2, characterized by FIGS. 2a and 2b, create a first contribution to the variation of the optical power of the lens 10 that is present between various directions of observation through this lens. They also create a first contribution to the variation of astigmatism of the lens 10 that is present simultaneously between these observation directions. Similarly, the variations of sphere and cylinder of the posterior face 3 of the lens 10, characterized by FIGS. 4a and 4b, create a second contribution to the variation of optical power of the lens 10, present between the same observation directions, as well as the second contribution to the variation of astigmatism of the lens 10 present between these directions. The variation of optical power of the lens 10 results from the combination of the first and second contributions thereto. Similarly, variation of the astigmatism of the lens 10 results from a combination of the corresponding first and second contributions. To a first approximation, the variations of optical power and astigmatism of the lens 10 are each equal to the oriented sum (that is to say taking account of the local orientation of the cylinders of each of the contributions) of the respective contributions of the two faces 2, 3 of the lens. Each contribution is evaluated by considering the sphere and cylinder values of the two faces 2, 3 at the points of intersection of these by the light ray which comes from the observation direction considered and which passes through the center of rotation of the eye.

Given that variations of sphere and cylinder of the face 3 are generally smaller than those of the face 2, the second contribution (due to the posterior face 3) to this variation of optical power of the lens 10 is less than the first contribution (due to the anterior face 2) to this variation of optical power, for most pairs of observation directions. Similarly, the second contribution (due to the posterior face 3) to the variation of astigmatism of the lens 10 is generally smaller than the first contribution (due to the anterior face 2) to this variation of astigmatism.

Figure 6A:
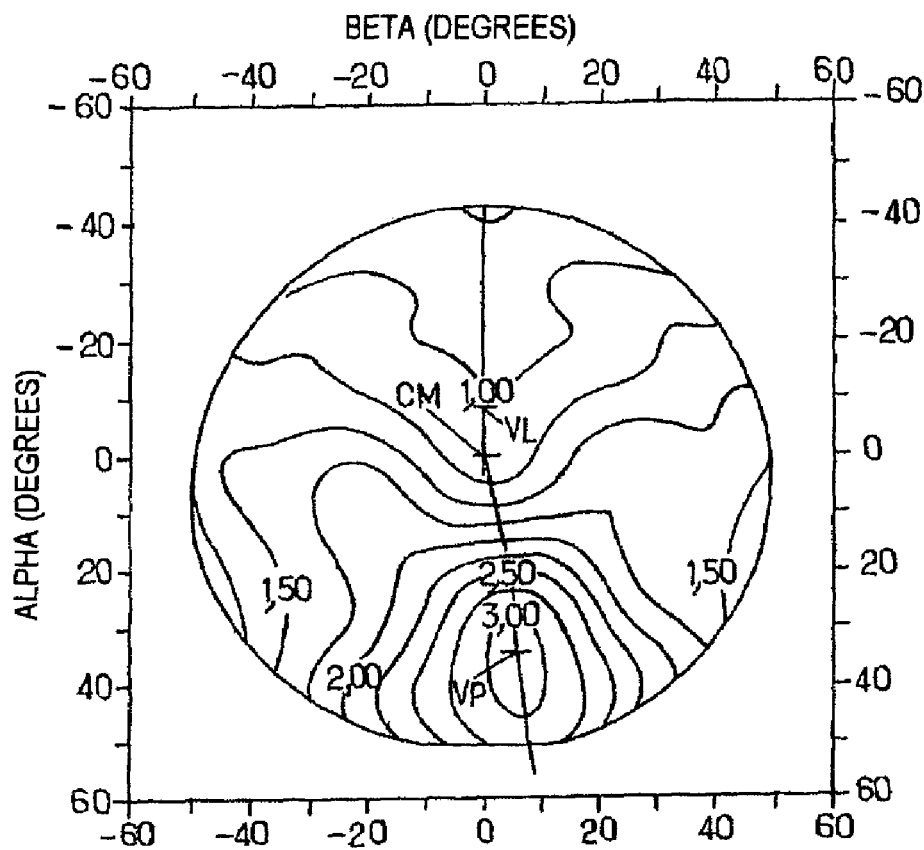
FIGS. 6a and 6b are maps of optical power and astigmatism of a lens having an anterior face according to FIGS. 2a and 2b and a posterior face according to FIGS. 4a and 4b.
Figure 6B:
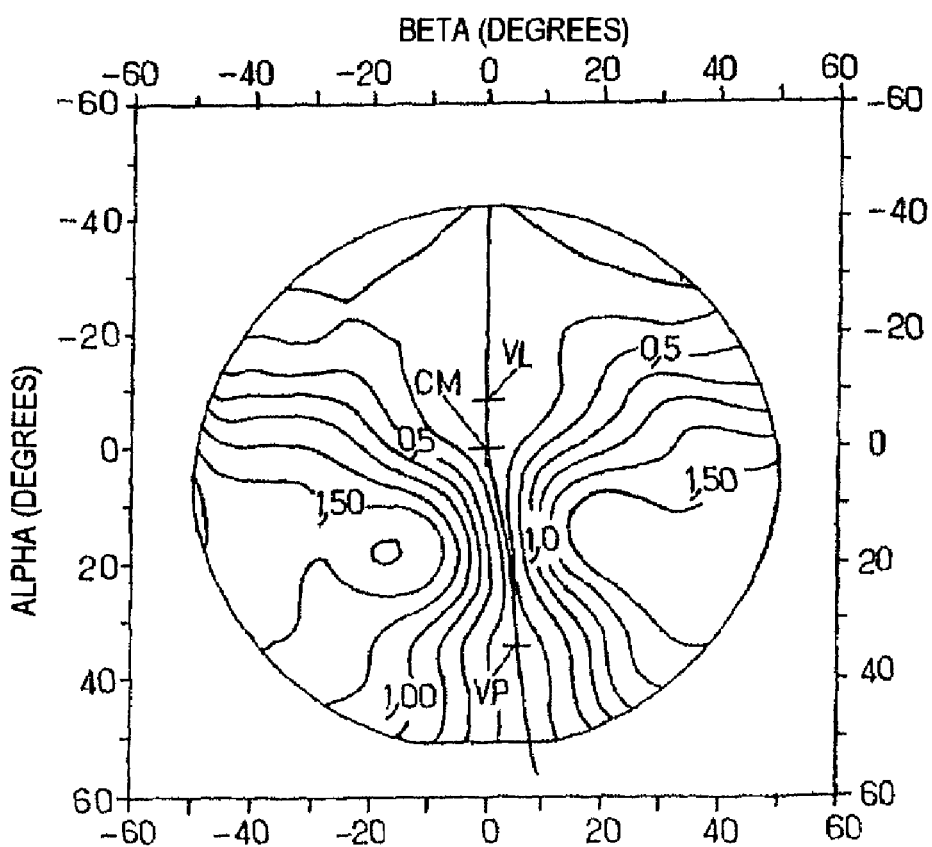

FIGS. 6a and 6b correspond respectively to FIGS. 3a and 3b, when the posterior face 3 of the lens 10 is machined so as to give it a shape that correspond to FIGS. 4a and 4b. On comparing 3a and 6a, it will be noted that the optical power values for the observation direction that correspond to the point VP are substantially identical (3.20 and 3.09 diopters for FIGS. 3a and 6a respectively). It is the same for the observation direction that corresponds to the point VL (0.99 and 1.00 diopters for FIGS. 3a and 6a respectively). In other words, the posterior face 3 of the lens 10 hardly makes any contribution to the addition of the lens. This addition (approximately 2.1 diopters) is therefore fixed almost only by the anterior face 2, given that the sphere values of the posterior face 3 at the points VP and VL are practically equal to each other.

By superimposing FIGS. 3b and 6b, it becomes apparent that the astigmatism lines of each figure corresponding to values 0.50 to 1.25 diopters have a generally V-shape that is narrower in FIG. 6b, on either side of the trace corresponding to the prime meridian line M at the height of the point VL. This means that the lens 10 which corresponds to FIGS. 6a and 6b has a narrower field of distance vision than that of the lens 10 corresponding to FIGS. 3a and 3b. On the other hand, the resultant astigmatism aberrations, present in the right-hand and left-hand parts of the lens 10 are reduced for the lens 10 that corresponds to FIGS. 6a and 6b, compared with the resultant astigmatism aberrations present in the lateral parts of the lens 10 corresponding to FIGS. 3a and 3b. Indeed, the maximum resultant astigmatism value visible in FIG. 6b is of the order of 1.75 diopters, while that visible in FIG. 3b is greater than 2.00 diopters. Moreover, the location of the observation direction for which the maximum astigmatism value is reached has been modified.

Machining the posterior face 3 of the lens according to the invention, that is to say by introducing variations of the sphere and cylinder of this face, has therefore made it possible to reduce the residual astigmatism present in the lateral parts of the lens. Simultaneously, the width of the distance field of vision has been reduced. Such a lens is therefore adapted to a wearer who mainly observes through a vertical central band of the lens. Such visual behavior consists mainly of turning the head rather than the eyes, in order to observe objects situated at the sides.

The invention therefore makes it possible to obtain a progressive lens having a reduced resultant astigmatism, adapted to a wearer who turns his head rather than his eyes, from a semifinished which corresponds to a wider distance field of vision, adapted to a wearer who turns his eyes rather than his head in order to see in the lateral parts of his field of vision. It should be understood that the invention also makes it possible to obtain, conversely, a progressive lens with a wider distance field of vision, adapted to a wearer who turns his head very little, from a semifinished corresponding to a small degree of resultant astigmatism and adapted to a wearer who turns his eyes very little. Lenses corresponding to each of the two types of wearer, namely a wearer who preferably turns his head and a wearer who preferably turns his eyes respectively, can therefore be obtained from semifinished of the same model. In other words, the invention makes it possible to obtain a lens of a given design from a semifinished of a different design. This change of design implemented subsequently makes it possible to adapt the progressive lens according to the behavior of the wearer without the need for a different semifinished model.

Figure 7B:
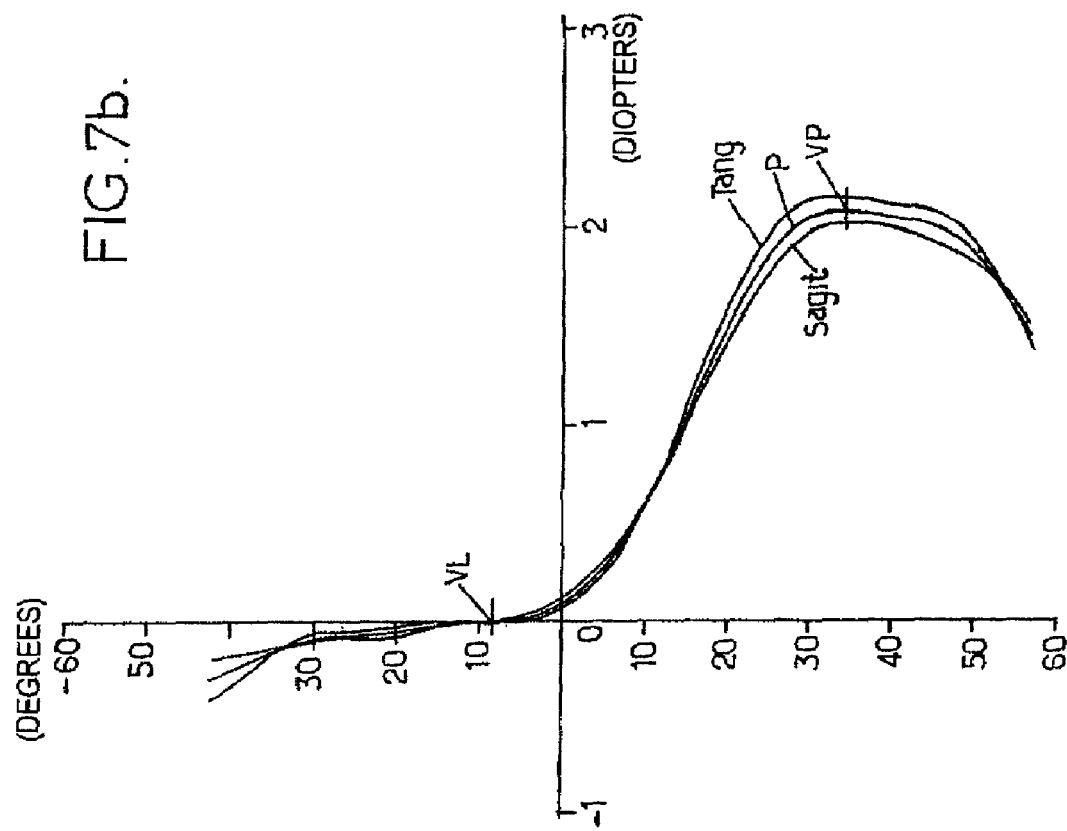
FIG. 7b represents variations in optical power and astigmatism of a lens corresponding to FIGS. 6a and 6b, along the prime meridian line.
Figure 7A:
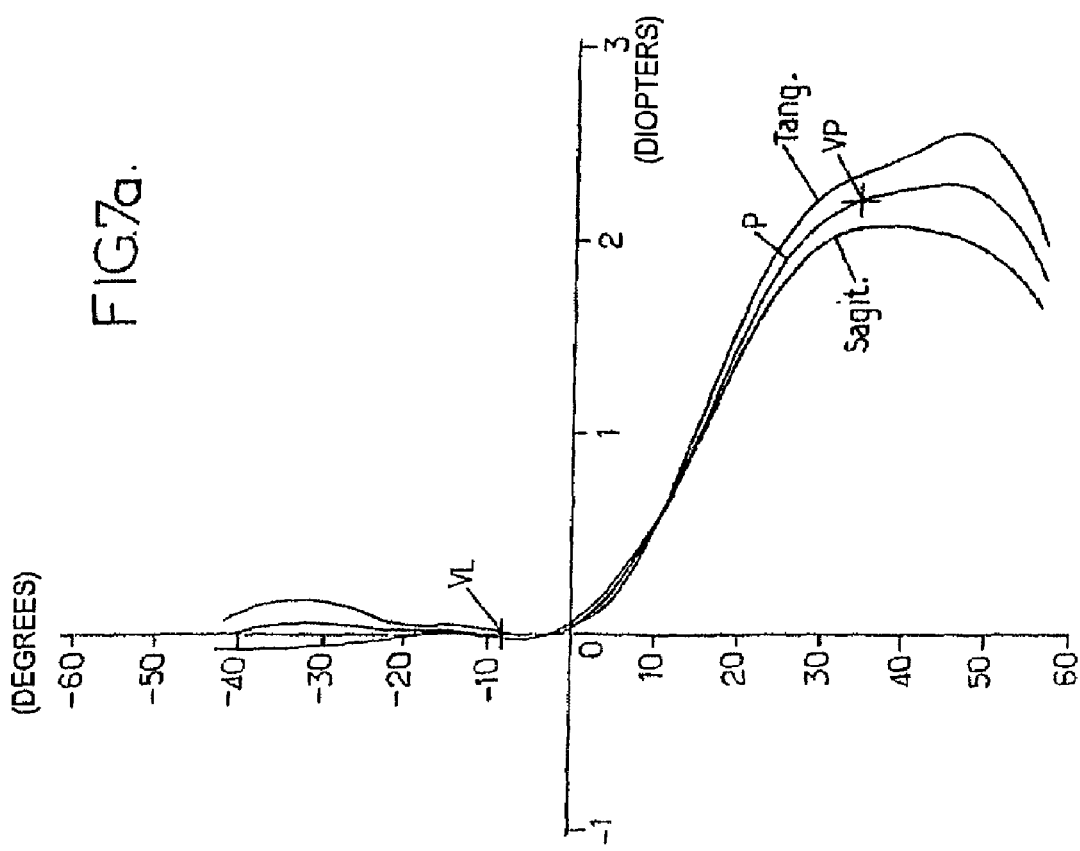
FIG. 7a represents variations in optical power and astigmatism of a lens corresponding to FIGS. 3a and 3b, along the prime meridian line.

Generally, various measurements enabling the behavior of the wearer to be characterized can be taken. In particular, the use of the intermediate vision zone of the lens by a given wearer can be characterized. This zone is located between the distance vision zone and the near vision zone, and is centered on the prime meridian line. It is known that vertical scanning of the intermediate vision zone by the eye can require a certain time for the wearer to adapt. Machining of the posterior face 3 according to the invention also makes it possible to adapt the variation in optical power of the lens in the intermediate vision zone, according to the behavior of the wearer. As an illustration, FIG. 7a represents variations in optical power (noted P in the figure) when the direction of observation varies along the prime meridian line of a lens according to FIGS. 3a and 3b. In the same way, FIG. 7b illustrates variations in optical power of a lens corresponding to FIGS. 6a and 6b. The form of the variation curve of the optical power between the observation directions passing through the points VL and VP of the lens differ between FIGS. 7a and 7b, in particular around the direction passing through the point VP. A lens according to FIG. 7b is more suitable than a lens according to FIG. 7a for a wearer who moves his eyes vertically rather than his head while reading.

FIGS. 7a and 7b additionally indicate the variations in tangential curvature (denoted Tang.) and sagittal curvature (denoted Sagit.) of the lens 10. These can also be adapted according to the wearer.

Other characteristics of progressive lenses can then be adapted by machining the posterior faces of the lenses. In particular, the lateral offset of the point VP with respect to the point VL, and also the balance between two matched lenses can be modified in this way.

Although the invention has been described in detail within the context of the design of a progressive lens that is customized by machining the posterior face of the lens, it should be recalled that other methods can be used in order to obtain similar customization of the lens. Among these other methods, mention may be made of adaptation of the refractive index of a layer of active material incorporated in the lens 10. FIGS. 8a-8c illustrate lens structures according to which the layer of active material 4 is respectively on the side of the anterior face 2 of the lens 10, on the side of the posterior face 3, or contained within the thickness of the intermediate medium 1. The layer 4 is substantially parallel to the faces 2 and 3 of the lens 10. Such a layer is made of an active transparent material with a refractive index which can be modified in a separate step at each point thereof. For some known active materials, such a modification of the refractive index can be obtained by irradiation using a laser beam or a UV lamp. In this case, the anterior face of the lens 10 is again finally formed during production of the semifinished, and the posterior face can be machined according to uniform cylinder and sphere values. Modulations of the refractive index of the layer 4 are then created subsequently during a specific step, by varying the intensity and/or duration of irradiation received between two different points of the layer 4. These modulations achieve customization of design of the progressive lens according to the behavioral characteristics of the wearer that have been measured.

Yet another method consists in producing the intermediate medium 1 that is itself made of active material.

Finally, the various methods for customizing a progressive lens can be combined together. Similarly, the physical parameter of the lens on which one of these methods is based can be used to give the lens the corrective power that corresponds to the prescription, while the physical parameter of another of these methods can be used for customizing the design of the progressive lens according to the behavioral characteristics of the wearer.

The invention claimed is:

1. A progressive ophthalmic lens comprising an anterior face, a posterior face and an intermediate medium producing variations in optical power and astigmatism when said lens is used by a wearer, in which said variations result from:
   a first contribution resulting from variations of a sphere and cylinder of the anterior face of the lens; and
   a second contribution resulting from variations of at least one physical parameter of the lens distinct from the sphere and cylinder of the anterior face, and distinct from the resulting optical effects of the sphere and cylinder of the anterior face,
and in which values of the physical parameter at different points on the lens are adapted so that the second contribution produces customization of the variations in optical power and astigmatism of the lens for a wearer as a function of at least one behavioral characteristic specific to the wearer,
   the lens being characterized in that it has a prescribed optical power and a prescribed astigmatism resulting from values of another physical parameter in different points of the lens, said other physical parameter being distinct from the sphere and cylinder of the anterior face, and from the physical parameter which produces the second contribution to the variations in optical power and astigmatism of the lens.

2. The lens as claimed in claim 1, in which the behavioral characteristic of the wearer comprises an amplitude of horizontal eye movements with respect to a rotation of the wearer's head, when the wearer scans a field of vision horizontally.

3. The lens as claimed in claim 1, in which, for the variation of optical power present between a distance vision point (VL) and a near vision point (VP) of the lens, the second contribution is less than the first contribution, in absolute values.

4. The lens as claimed in claim 3, in which, for the variation of optical power present between the distance vision point (VL) and the near vision point (VP) of the lens, the second contribution is substantially zero.

5. The lens as claimed in claim 1, in which the physical parameter comprises a sphere and cylinder of the posterior face of the lens, a refractive index of a substantially transparent layer included within the lens, or a refractive index of the intermediate medium.

6. The lens as claimed in claim 1, in which said other physical parameter of the lens comprises a sphere and cylinder of the posterior face of the lens, a refractive index of a substantially transparent layer included within the lens, or a refractive index of the intermediate medium.

7. The lens as claimed in claim 1, in which the variations of the physical parameter are adapted so that a width of a field of near vision and/or a field of distance vision of the lens, is modified with respect to an effective field of near vision and/or an effective field of distance vision respectively, resulting only from the variations of the sphere and cylinder of the anterior face of the lens.

8. A progressive ophthalmic lens comprising an anterior face, a posterior face and an intermediate medium producing variations in optical power and astigmatism when said lens is used by a wearer, in which said variations result from:
   a first contribution resulting from variations of a sphere and cylinder of the anterior face of the lens; and
   a second contribution resulting from variations of at least one physical parameter of the lens distinct from the sphere and cylinder of the anterior face,
and in which values of the physical parameter at different points on the lens are adapted so that the second contribution produces customization of the variations in optical power and astigmatism of the lens as a function of at least one behavioral characteristic of the wearer,
   the lens being characterized in that it has a prescribed optical power and a prescribed astigmatism resulting from values of another physical parameter in different points of the lens, said other physical parameter being distinct from the sphere and cylinder of the anterior face, and from the physical parameter which produces the second contribution to the variations in optical power and astigmatism of the lens, and
   the variations of the physical parameter are adapted so that a maximum value for astigmatism reached at a point located in lateral parts of the lens and/or a location of said point is modified with respect to an effective maximum value of astigmatism and/or an effective location, respectively, resulting only from variations of the sphere and of the cylinder of the anterior face of the lens.

9. The lens as claimed in claim 1, in which the variations of the physical parameter are adapted so that a continuous variation of the optical power of the lens along a meridian line (M) between a distance vision point (VL) and a near vision point (VP) of the lens, is modified with respect to an effective variation of the optical power between said points resulting only from the variations of the sphere and of the cylinder of the anterior face of the lens.

10. The lens as claimed in claim 1, in which the variations of the physical parameter are adapted so that a near vision point of the lens (VP) is displaced laterally with respect to an effective location of said point resulting only from the variations of the sphere and of the cylinder of the anterior face of the lens.

11. A method for producing a progressive ophthalmic lens comprising an anterior face, a posterior face and an intermediate medium, the method comprising the following steps:
   producing a semifinished lens in which the anterior face has variations in a sphere and cylinder in order to obtain a first contribution to variations in optical power and astigmatism of the lens when said lens is used by a wearer;
   measuring at least one behavioral characteristic of a wearer of the lens;
   determining values of a physical parameter of the lens distinct from the sphere and cylinder of the anterior face, and distinct from the resulting optical effects of the sphere and cylinder of the anterior face, so that a second contribution to the variations in optical power and astigmatism of the lens results from variations of said physical parameter between different points on the lens, said second contribution achieving customization of the variations of optical power and astigmatism of the lens for the wearer according to the behavioral characteristic measured specific to the wearer, and
   modulating the physical parameter so as to obtain said second contribution, wherein the values of another physical parameter distinct from the sphere and cylinder of the anterior face, and from the physical parameter that produces the second contribution to the variations in optical power and astigmatism of the lens at different points on the lens are determined so as to obtain a prescribed optical power and a prescribed astigmatism for the lens.

12. The method as claimed in claim 11, wherein the measured characteristic of the wearer comprises an amplitude of horizontal eye movements with respect to a rotation of the wearer's head, when the wearer scans a field of vision horizontally.

13. The method as claimed in claim 11, wherein the values of the physical parameter are further determined so that, for the variation of optical power present between a distance vision point (VL) and a near vision point (VP) of the lens, the second contribution is less than the first contribution, in absolute values.

14. The method as claimed in claim 13, wherein the values of the physical parameter are further determined so that, for the variation of optical power present between the distance vision point (VL) and the near vision point (VP) of the lens, the second contribution is substantially zero.

15. The method as claimed claim 11, wherein the physical parameter comprises a sphere and a cylinder of the posterior face of the lens, and wherein modulation of the physical parameter is carried out during a subsequent machining of the posterior face of the lens.

16. The method as claimed in claim 11, wherein the physical parameter comprises a refractive index of a substantially transparent layer included within the semifinished lens, said layer consisting of a material with a refractive index that can be adjusted by irradiation, and wherein the physical parameter is modulated by selectively irradiating different portions of said layer in a variable manner.

17. The method as claimed in claim 11, wherein the physical parameter comprises a refractive index of the intermediate medium of the lens, said intermediate layer consisting of a material with a refractive index that can be adjusted by irradiation, and wherein the physical parameter is modulated by selectively irradiating different portions of the intermediate medium in a variable manner.

18. The method as claimed in claim 11, wherein said other physical parameter comprises a sphere and a cylinder of the posterior face of the lens, and wherein modulation of said other parameter is carried out during a subsequent machining of the posterior face of the lens.

19. The method as claimed in claim 11, wherein said other physical parameter comprises a refractive index of a substantially transparent layer included within the lens, said layer consisting of a material with a refractive index that can be adjusted by irradiation, and wherein said other physical parameter is modulated by selectively irradiating different portions of said layer in a variable manner.

20. The method as claimed in claim 11, wherein said other physical parameter comprises a refractive index of the intermediate medium of the lens, said intermediate medium consisting of a material with a refractive index that can be adjusted by irradiation, and wherein said other physical parameter is modulated by selectively irradiating different portions of the intermediate medium in a variable manner.

21. The method as claimed in claim 11, wherein modulation of the physical parameter is further determined so that the second contribution to variations in optical power and astigmatism of the lens widens a field of near vision and/or a field of distance vision of the lens, with respect to an effective field of near vision and/or an effective field of distance vision respectively, resulting only from the first contribution.

22. A method for producing a progressive ophthalmic lens comprising an anterior face, a posterior face and an intermediate medium, the method comprising the following steps:
producing a semifinished lens in which the anterior face has variations in a sphere and cylinder in order to obtain a first contribution to variations in optical power and astigmatism of the lens when said lens is used by a wearer;
measuring at least one behavioral characteristic of a wearer of the lens;
determining values of a physical parameter of the lens distinct from the sphere and cylinder of the anterior face, so that a second contribution to the variations in optical power and astigmatism of the lens results from variations of said physical parameter between different points on the lens, said second contribution achieving customization of the variations of optical power and astigmatism of the lens according to the behavioral characteristic measured, and
modulating the physical parameter so as to obtain said second contribution, wherein the values of another physical parameter distinct from the sphere and cylinder of the anterior face, and from the physical parameter that produces the second contribution to the variations in optical power and astigmatism of the lens at different points on the lens are determined so as to obtain a prescribed optical power and a prescribed astigmatism for the lens,
wherein modulation of the physical parameter is further determined so that the second contribution to the variations in astigmatism of the lens modifies a maximum astigmatism value reached at a point located in lateral parts of the lens and/or a location of said point, with respect to a maximum effective astigmatism value and/or an effective location, respectively, resulting only from the first contribution.

23. The method as claimed in claim 11, wherein modulation of the physical parameter is further determined so that the second contribution to the variations in optical power of the lens modifies a progression of the optical power of the lens along a meridian line (M) between a distance vision point (VL) and a near vision point (VP) of the lens, with respect to an effective progression of optical power between said points resulting only from the first contribution.

24. The method as claimed in claim 11, wherein the modulation of the physical parameter is further determined so that the second contribution to the variations in optical power and astigmatism of the lens displaces a near vision point of the lens (VP) laterally with respect to an effective location of said point resulting only from the first contribution.

* * * * *